United States Patent [19]
Ohno et al.

[11] Patent Number: 5,937,902
[45] Date of Patent: Aug. 17, 1999

[54] ROTARY FLOW-PATH EXCHANGING VALVE

[75] Inventors: Michiaki Ohno; Fumio Kanasaki; Mitsuaki Noda; Kazunori Aihara; Noboru Nakagawa; Kazushige Suzuki; Mitsuo Sugita; Toshihiro Teranishi; Kazuo Hirata, all of Saitama, Japan

[73] Assignee: Kabushiki Kaisha Saginomiya Seisakusho, Tokyo, Japan

[21] Appl. No.: 09/106,763

[22] Filed: Jun. 30, 1998

[30] Foreign Application Priority Data

Jun. 30, 1997 [JP] Japan .................................. 9-0174929

[51] Int. Cl.⁶ .................................................. F16K 11/06
[52] U.S. Cl. ...................................... 137/625.43; 251/288
[58] Field of Search ........................ 137/625.43, 625.46; 251/286, 288

[56] References Cited

U.S. PATENT DOCUMENTS

| | | | |
|---|---|---|---|
| 330,861 | 11/1885 | Wuerpel .......................... | 137/625.43 X |
| 2,855,000 | 10/1958 | Van Allen et al. ................. | 137/625.43 |
| 4,825,908 | 5/1989 | Tsuchihashi et al. .............. | 137/625.43 |

*Primary Examiner*—John Fox
*Attorney, Agent, or Firm*—McDermott, Will & Emery

[57] ABSTRACT

In a rotary flow-path exchanging valve, a high pressure side communicating groove 37 is provided to communicate a first exchanging port 23 and a second exchanging port 27 of a valve seat plate 5 with a high pressure side communicating port selectively. A part of a joint pipe 17 to be connected to the high pressure side port 19 is protruded into the high pressure side communicating groove 27. The protruding part constitutes a stopper pipe 20 for limiting the rotatable range of a valve element 1. In installing the stopper pipe 20, it is connected and secured to the high pressure side port 19 of the valve seat plate 5, and thereafter is hardened by plastic deformation processing. Thus, when the stopper pipe is heated by soldering for its securing to the valve seat 5, the necessary strength thereof can be maintained.

5 Claims, 7 Drawing Sheets

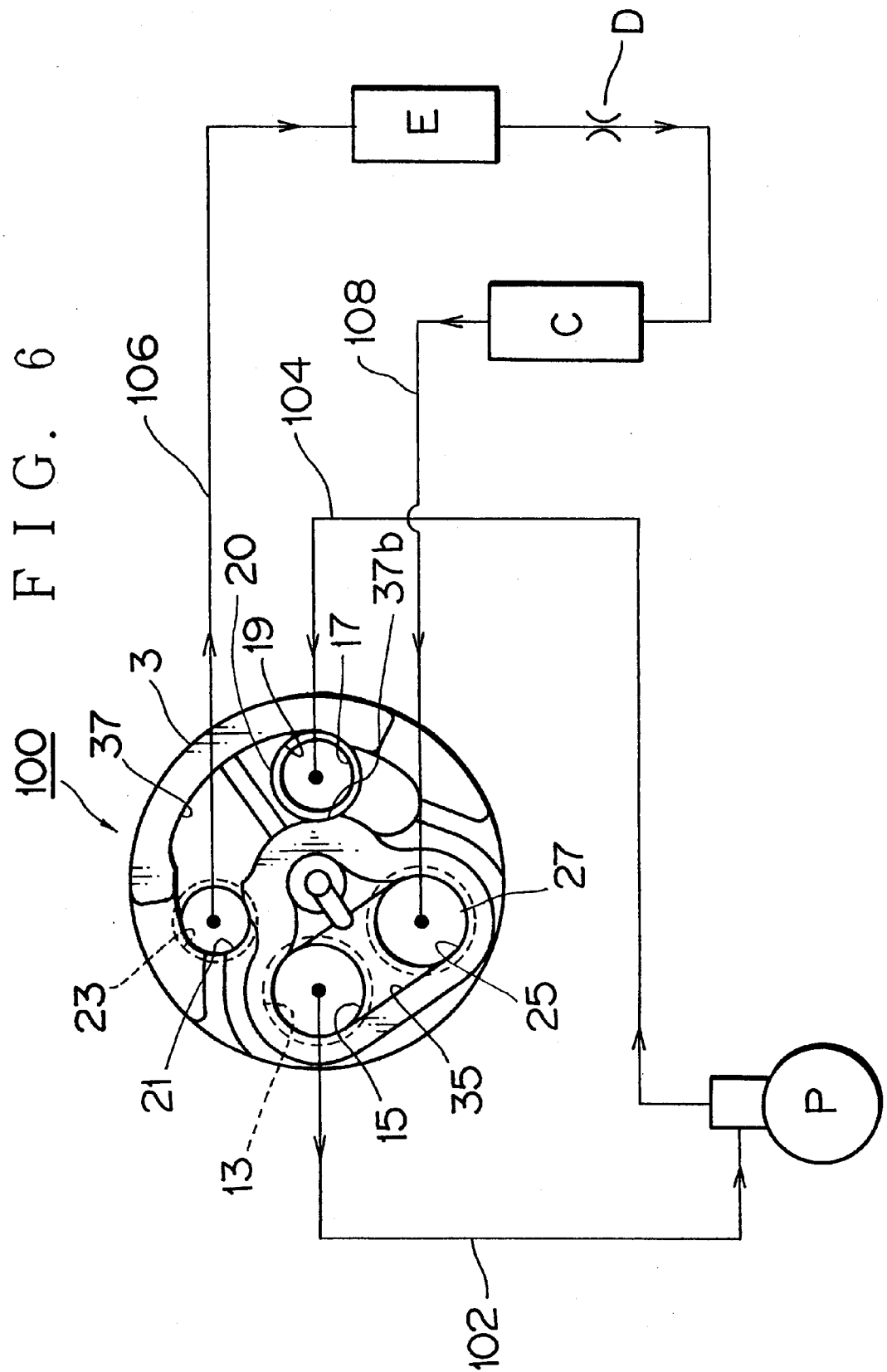

ROTARY FLOW-PATH EXCHANGING VALVE

BACKGROUND OF THE INVENTION

1. Field of the Invention

The present invention relates to a flow-path exchanging valve and more particularly to a three-way valve or four-way valve which is equipped with a stopper pipe for a valve element and is used in a heat pump system.

2. Description of the Prior Art

A previously known typical example of the rotary flow path exchanging valve is a four-way valve or three-way valve comprises a cylindrical valve housing, a valve element rotatably attached to the valve housing, a valve seat plate and an electromagnetic actuator. The valve seat plate includes a low pressure port secured to the valve housing and connected to a low-pressure conduit, a high pressure port secured to a high pressure conduit and at least one exchanging port. The valve element is brought into contact with the valve seat plate at its end surface and rotates between a first rotary position and a second rotary position so that said exchanging port is selectively communicated with either one of said low pressure port and said high pressure port.

The rotary flow-path exchanging valve includes a high pressure communicating groove for communicating the high pressure port formed in the valve element with the exchanging port and a low pressure communicating groove for communicating the low pressure port with the exchanging port. A stopper pipe is secured to the high pressure port or low pressure port of the valve seat plate. The stopper pipe protrudes into the high pressure communicating groove or the low pressure communicating groove. The stopper pipe abuts on the side wall of the high pressure communicating groove or low pressure communicating groove to limit the rotary range of the valve element between the first rotary position and second rotary position in a door-stop manner. Thus, a first exchanging state, in which the exchanging port is communicated with the high pressure port, and a second exchanging state, in which the exchanging port is communicated with the low pressure port, are established correctly. The above rotary flow-path exchanging valve has the following disadvantages. When the stopper pipe is heated at a high temperature to solder the stopper pipe to the high pressure port of the valve seat plate, the material of the stopper pipe may soften to make it impossible to maintain the necessary strength of the stopper pipe. For example, when the temperature of the stopper pipe of copper exceeds its recrystallization temperature of 350–400° C., the grain size increases. This largely attenuates the hardness of the stopper to provide an insufficient strength and hence unsatisfactory endurance thereof.

In order to overcome such an inconvenience, it can be proposed that the stopper pipe be made of a special material that does not soften when it is heated at a high temperature by soldering. In this case, however, high cost is required. Therefore, the joint pipe for conduit connection which is to be attached to the high pressure port and low pressure port must be constituted by different materials.

SUMMARY OF THE INVENTION

An object of the present invention is to provide a rotary-flow path exchanging valve which can maintain the necessary strength of the stopper pipe made of a normal material when it is heated to be soldered to the valve seat plate and can satisfy the endurance performance of the stopper pipe with no increase in cost.

In order to attain the above object, there is provided a rotary flow-path exchanging valve comprising: a cylindrical valve housing; a valve seat plate having a low pressure side port secured to said valve housing and connected with a low pressure side conduit, a high pressure side port connected to a high pressure side conduit and an exchanging port; a valve element rotatably provided within the cylindrical valve housing; the valve element being in contact with the valve seat plate in its one end surface so that the exchanging port is selectively communicated with either one of the low pressure side port and the high pressure side port by rotation between a first rotary position and a second rotary position, the valve element having a high pressure communicating groove for communicating said high pressure side port with the exchanging port and a low pressure communicating groove for communicating the low pressure side port with the exchanging port; an electromagnetic solenoid for rotating the valve element; a hard stopper pipe secured to either one of the high pressure side port and the low pressure side port and protruding into the high pressure communicating groove or said low pressure side communicating groove, the stopper pipe abutting on different side walls apart from each other of the high pressure side communicating groove or the low pressure side communicating groove in a rotary direction of said valve element to limit a rotation range of the valve element between the first rotary position and the rotary position (Claim 1).

There is also provided a method for installing a stopper pipe for the rotary flow-path exchanging valve of the above flow-exchange valve comprising the steps: securing the stopper pipe to either one of the high pressure side port and the low pressure side port; and hardening the stopper pipe by plastic deformation (Claim 5).

In accordance with the present invention, when the stopper pipe hits the high pressure side communicating groove or low pressure side communicating groove by the rotation of the valve element, the stopper pipe can have a strength enough to endure hitting shock.

Preferably, a rotary flow-path exchanging valve further comprising a joint pipe for conduit connection attached to the high pressure side port or said low pressure side port and formed integrally to the stopper pipe (claim 2).

Such a configuration contributes to reduce the number of components of the valve and number of man-hours for installing.

Preferably, in the above rotary-flow exchanging valve, the valve seat plate has a first exchanging port and a second exchanging port; at the first rotary position of the valve element, the low pressure side port is communicated with said first exchanging port and said high pressure side port is communicated with the second exchanging port, at said second rotary position of the valve element, the low pressure side port is communicated with the second exchanging port and the high pressure side port is communicated with the first exchanging port; and the flow-path exchanging valve is a four-way valve used in a heat pump system (claims 3, 4).

The above and other objects and features of the present invention will be more apparent from the following description taken in conjunction with the accompanying drawings.

BRIEF DESCRIPTION OF THE DRAWINGS

FIG. 6 is a view for explaining a refrigerant circuit during heating in a heat pump system in which the rotary flow-path exchanging valve is built;

DESCRIPTION OF THE PREFERRED EMBODIMENTS

Figure 1:
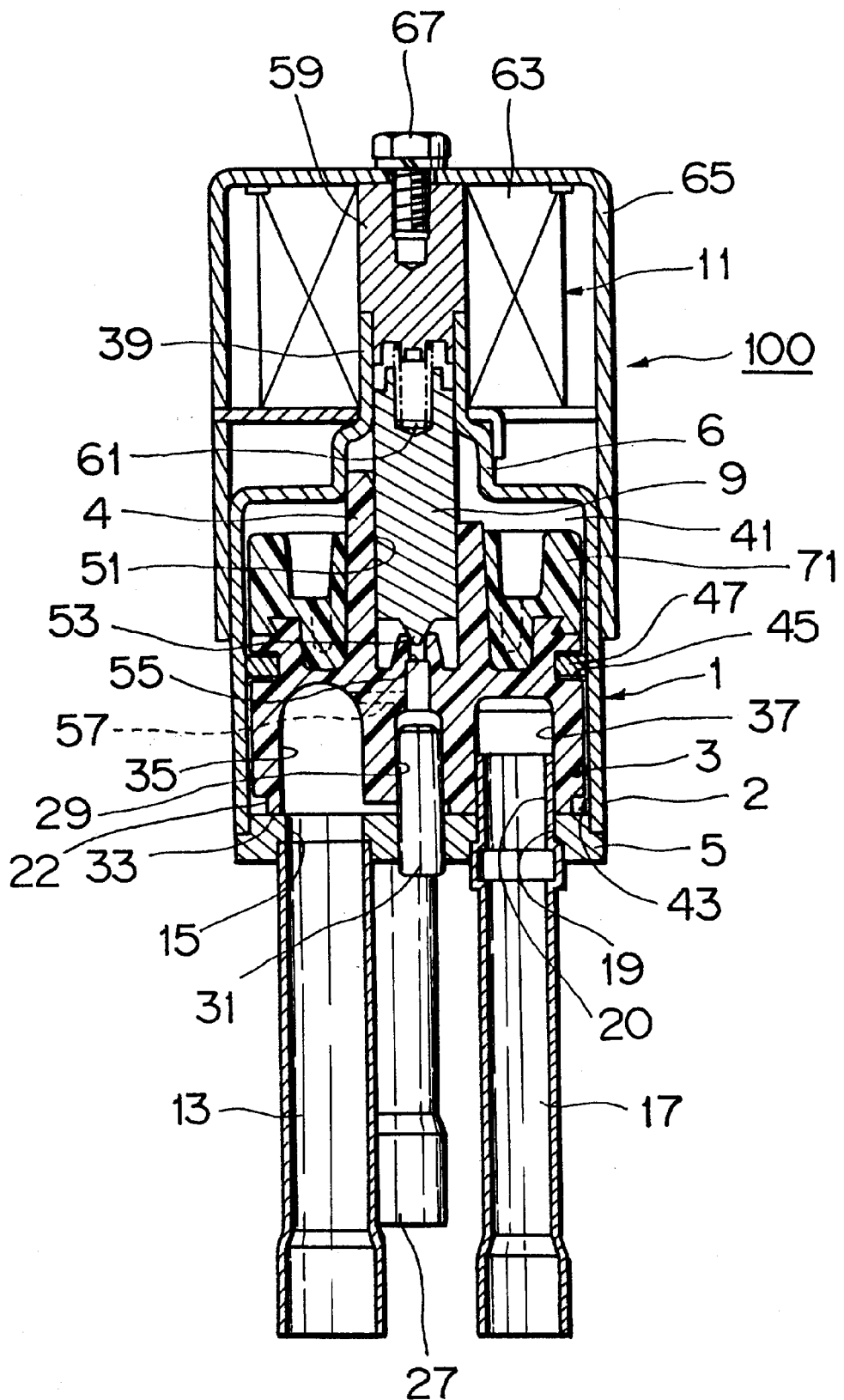
FIG. 1 is a longitudinal cross sectional view of a rotary flow-path exchanging valve equipped with a stopper pipe according to the present invention.
Figure 2:
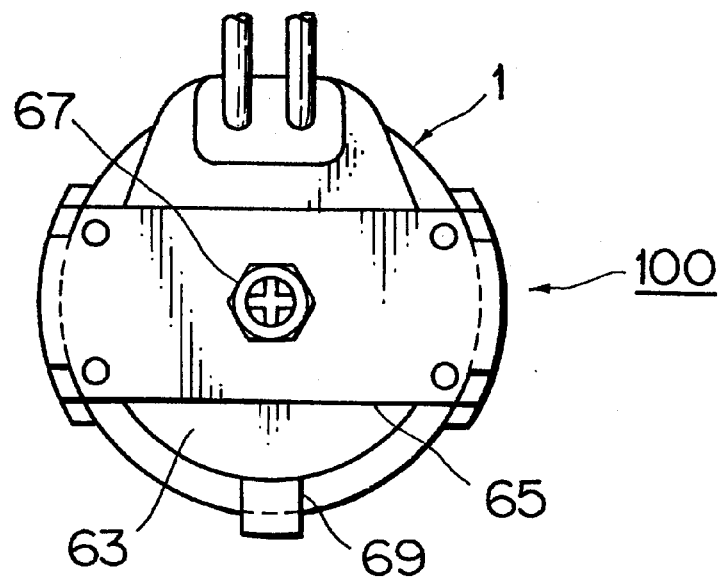
FIG. 2 is a plan view of the rotary flow-path exchanging valve of FIG. 1.
Figure 3:
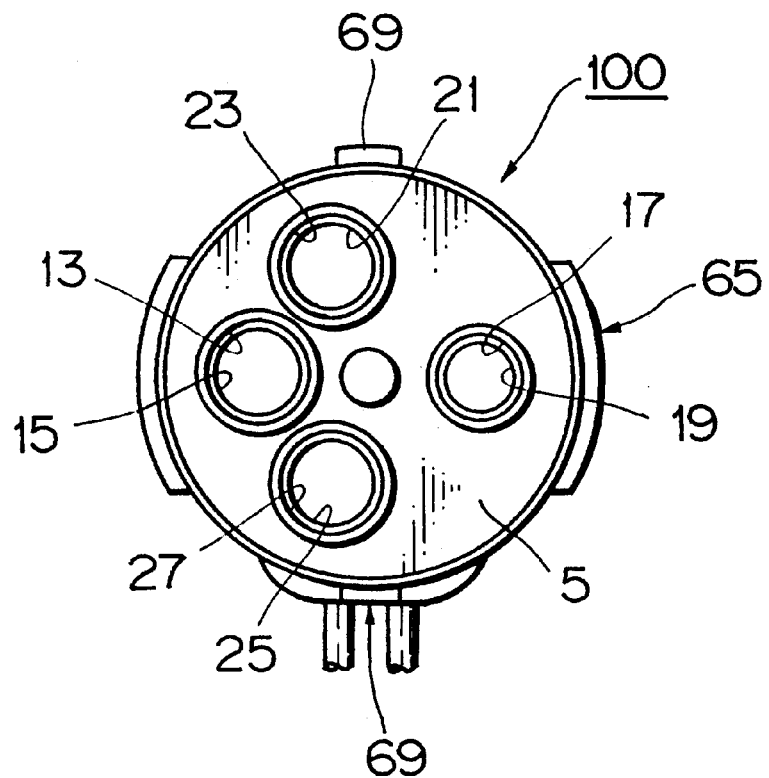
FIG. 3 is a bottom view of the rotary flow-path exchanging valve of FIG. 1.
Figure 4:
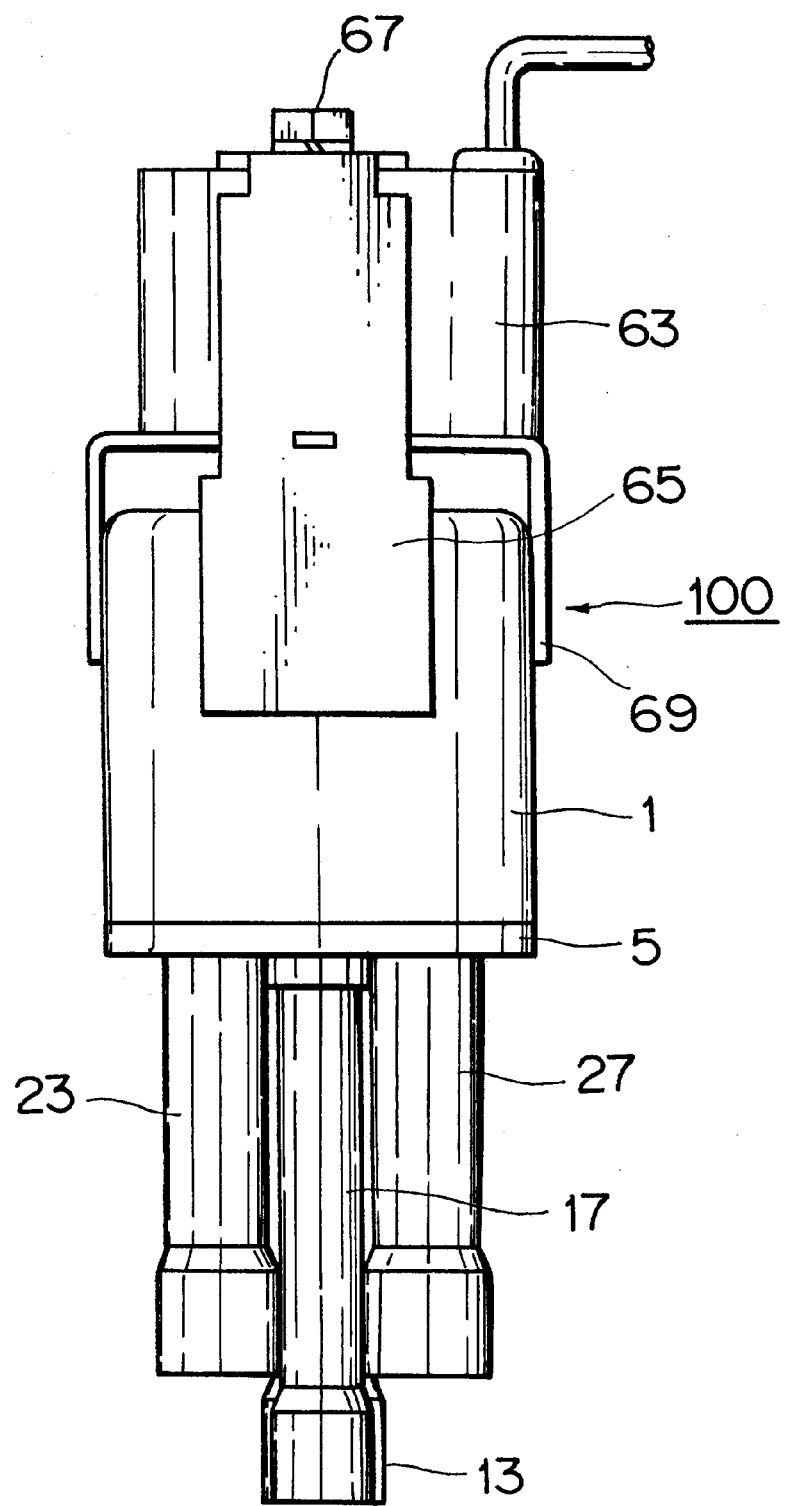
FIG. 4 is a side view of the rotary flow-path exchanging valve of FIG. 1.

Now referring to FIGS. 1–10, an explanation will be given of the configuration of a flow-path exchanging valve equipped with a stopper pipe according to an embodiment of the present invention.

The rotary flow-path exchanging valve according to this embodiment includes a cylindrical valve housing 1, a main valve element 3 which is provided rotatably and movably in a rotary axial direction, a valve seat plate 5 secured to the bottom of the valve housing 1, a pilot valve 9 and an electromagnetic solenoid 11 attached to the upper portion of the valve housing 1.

The rotary flow-path exchanging valve is structured as a four-way valve 100 used in a heat pump system. At the positions displaced radially from the center of a valve seat plate 5, the valve seat plate 5 has a low pressure port 15, high pressure port 19, first exchanging port 23 and second exchanging port 27 into which joint pipes 13, 17, 21 and 25 for conduit connection are fit, respectively.

Figure 5:
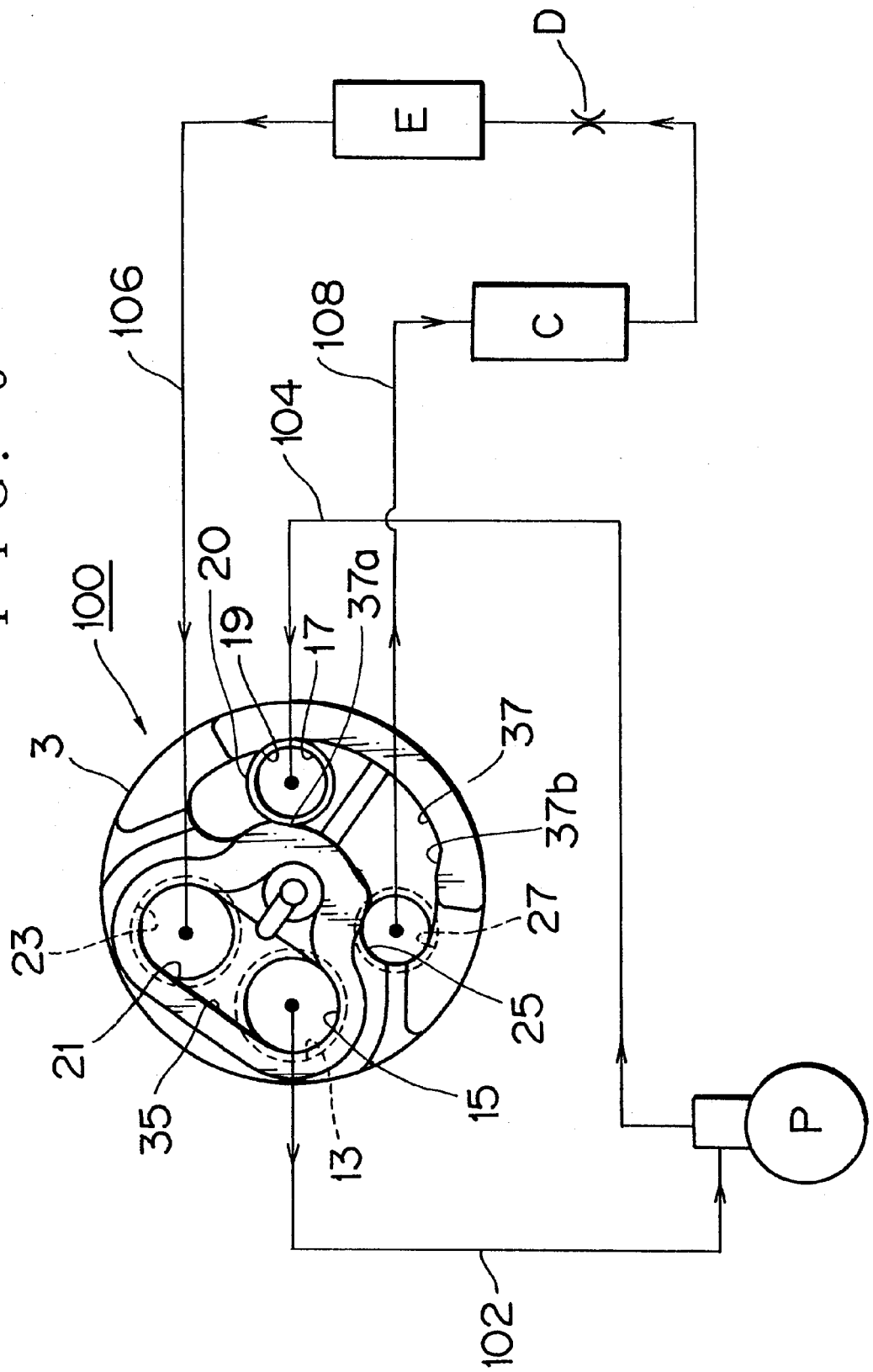
FIG. 5 is a view for explaining a refrigerant circuit during cooling in a heat pump system in which the rotary flow-path exchanging valve is built.

As shown in FIGS. 5 and 6, a first conduit 102 from a suction side of a compressor P in a heat pump system is connected to a low pressure side port 15 through a first joint pipe 13. A second conduit 104 from a discharge side of the compressor P is connected to a high pressure side port through a second joint pipe 17. A third conduit 106 for an indoor heat exchanger E is connected to the first exchanging port 23 through a third joint pipe 21. A fourth conduit 107 for an outdoor heat exchanger C is connected to the second exchanging port 27 through a fourth joint pipe 25.

As seen from FIG. 1, the main valve element 3 fits over a center pin 31 secured to the valve seat plate 5 by means of a center guide hole 29 provided at the bottom, and fits into a guiding cylinder 6 for the main valve element so that it is movable in the axial direction. In this case, the guiding cylinder 6 is provided coaxially with a large diameter cylinder 2 at the upper part of the valve housing 1 by means of a guiding tongue-shaped member 4 protruded from the upper surface. Because of provision of these guiding members, the main valve element 3 is rotatable between the first rotating position and the second rotating position around its center axis and vertically movable between the ascended position and descended position in the axial direction.

At the descended position, the main valve element 3 is in contact with the valve seat plate 5 in its bottom 33, and has a low pressure communicating groove 35 and a high pressure communication groove 37 which are independent of each other.

At the first rotating position, as seen from FIG. 5, the main valve element 3 communicates the low pressure port 15 with the first exchanging port 23 by means of the low pressure communicating groove 35 and also communicates the high pressure port 19 with the second exchanging port 27 by means of the high pressure communicating groove 37. On the other hand, at the second rotating position, as seen from FIG. 6, the main valve element 3 communicates the low pressure port 15 with the second pressure exchanging port 27 by means of the low pressure communicating groove 35 and also communicates the high pressure port 15 with the first exchanging port 23 by means of the high pressure communicating groove 37.

Thus, in the first exchanging state where the main valve element 3 is at the first rotating position, as seen from FIG. 5, a circulating passage of refrigerant is built which travels in the course of the compressor P→four-way valve 100→outdoor heat exchanger C→diaphragm D→indoor heat exchanger E→four-way valve 100→compressor P. Thus, the heat pump system is placed in a cooling mode.

On the other hand, in the second exchanging state where the main valve element 3 is at the second rotating position, as seen from FIG. 6, a circulating passage of refrigerant is built which travels in the course of the compressor P→four-way valve 100→indoor heat exchanger E→diaphragm D→outdoor heat exchanger C→four-way valve 100→compressor P. Thus, the heat pump is placed in a heating mode.

On the upper side of the main valve element 3, as shown in FIG. 1, a pressure chamber 41 is defined by the valve housing 1 and pilot valve 9 fitting into the guiding cylinder 39 formed at the upper portion of the valve housing 1. The pressure chamber 41 communicates with a high pressure side communicating groove 37 and high pressure side port 19 through a bypassing gap 43, which is located between the pilot valve 9 and main valve element 3, and a slit (not shown), which is formed between both ends of a C-shaped piston ring 47 fit into the piston ring groove 45 of the main valve element 3. Thus, the pressure at the high pressure side port is introduced into the pressure chamber 41.

The guiding cylinder 39 is provided concentrically with the large diameter cylinder 2 and the guiding cylinder 6. The plunger 10 of the pilot valve 9 fits movably, in an axial direction, into a valve holding hole 51 having a circular sectional plane formed in the guiding cylinder 39 and at the central portion of the main valve element 3. The plunger 10 opens/closes the valve port 55 formed at the main valve element 3 by means of a needle valve 53 at the tip.

In this configuration, the pilot valve 9 fits, in an axial direction, into the guiding cylinder 39 on the side of the valve housing 1 and the valve holding hole 51 on the side of the main valve element 3, and hence are individually supported by both the valve housing 1 and main valve element 3.

Figure 8A:
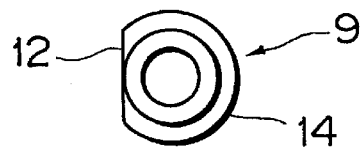
FIGS. 8A to 8D are end views each showing a pilot valve of FIG. 1.
Figure 8B:
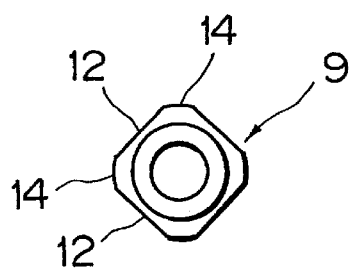
Figure 8C:
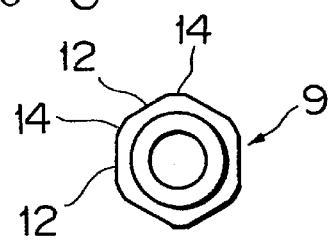

The plunger 10 may have a concrete configuration as shown in FIGS. 8A–8C in which a cut face 12 is made on the outer periphery to form a D-shaped cross section or a polygonal cross section and only the remaining circular face 14 fits into the guiding cylinder 39 and holding hole 51.

In this case, between the cut face 12 of the pilot valve 9 and valve holding hold 51, a passage (not shown) communicates the pressure chamber 41 with the valve port 55.

Figure 8D:
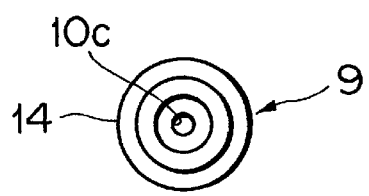

The plunger 10 may have another concrete configuration as shown in FIG. 8D in which an outer face corresponding to the inner face of the guiding cylinder 39 and valve holding hole 51 to form a cylinder shape and the entire circular face fits into the guiding cylinder 39 and valve holding hole 51.

Figure 8E:
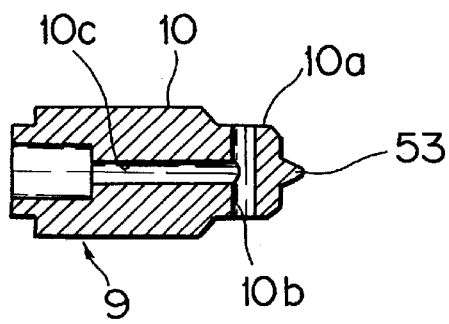
FIG. 8E is a sectional view of the pilot valve of FIG. 8D.
Figure 7:
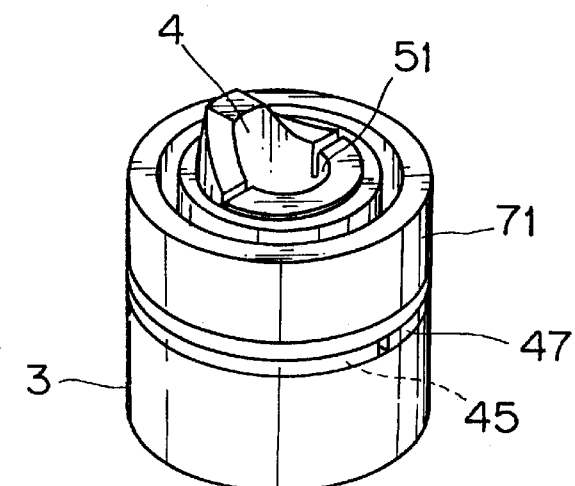
FIG. 7 is a perspective view of a main valve element shown in FIG. 1.

In this case, as shown in FIG. 8E, a small diameter portion 10a is formed at a tip near to the needle valve 53 of the plunger 10. At the small diameter portion 10a, a through-passage 10b passing the center of the plunger 10 is passed through in a radial direction of the plunger 10. A communicating passage 10c is formed which extends from an end surface located on the guiding cylinder 39 to the center of the passage 10b. Thus, the through-passage 10b, communicating passage 10c and the space between the small diameter portion 10a and valve holding hole 51 form a passage communicating the pressure chamber 41 and valve port 55.

The valve port 55, located at the center of the valve holding hole 51, on one hand, communicates with the pressure chamber 41 through the bypassing gap 43, and on the other hand, also with the low pressure side communicating groove 35 through the communicating hole 57.

The valve housing 1 is integrally formed by processing of deep drawing so that the large diameter cylinder 2 to receive the main valve element, is concentric with the guiding cylinder 6 and the guiding cylinder 39.

The pilot valve 9 is urged in a valve-closing direction by a spring 61 formed between the electromagnetic solenoid 11 and fixed absorber 59. When the electromagnetic coil 63 is energized, the pilot valve 9 is adsorbed on the fixed absorber 59 against the spring force so that the valve port 55 is opened.

The multi-pole magnet 71 of plastic magnet is integrally formed on the main valve element 3 by insert molding. The multi-pole magnet 71 is ring-shaped concentrically with the main valve element 3, and has two N-poles and two S-poles magnetized alternately in a rotary direction of the magnetic valve element 3.

A staple-shaped main magnetic pole member 65, magnetically coupled with the upper one magnetic pole of the electromagnetic pole 63, is secured to the electromagnetic solenoid 11 by a bolt 67. A staple-shaped auxiliary magnetic member 69, magnetically coupled with the lower other magnetic pole of the magnetic pole 63, is secured thereto at the position out of phase by 90° from the main magnetic member 65 with respect to the center line of the valve housing 1.

In the electromagnetic actuator structure composed of the electromagnetic solenoid 11 and multi-pole magnet 71 thus configured, in accordance with the direction of a current flowing through the electromagnetic solenoid 11, the main magnetic pole member 65 is magnetized with an N-pole while the auxiliary magnetic pole member 69 is magnetized with an S-pole, and vice versa. Their magnetic operation with the multi-pole magnetic 71 rotates the main valve element 3 from the first rotary position to the second rotary position and vice versa.

The joint pipe 17 penetrates through the high pressure side port 19 to protrude into the high pressure side communicating groove 37. This protruding portion constitutes a stopper pipe 20. Namely, the joint pipe 17 partially serves as the stopper pipe 20. Incidentally, the joint pipe 17 has a large diameter portion 22 for defining the length protruding for the high pressure side communicating groove 37.

The stopper pipe 20 abuts on the side wall 37a on the one side of the high pressure side communicating groove 37 to define the first rotary position (first exchanging state) of the main valve element 3. On the other hand, the stopper pipe 20 abuts on the side wall 37b of the other side of the high pressure side communicating groove 37 to define the second rotary position (second exchanging state) of the main valve element 3. Thus, the rotating range of the main valve element 3 is limited between the first rotary position and second rotary position in a door-stop manner.

After the joint pipe 17 is secured to the high pressure side port by soldering, for example, the portion of the stopper pipe 20 of the joint pipe 17 is hardened by cold plastic deformation work of enlarging the end portion of the pipe. Thus, within the portion of the stopper pipe 20 of the joint pipe 17, the arrangement of crystal lattice collapses to give lattice defects such as dislocation and void so that the material is hardened.

In the four-way valve 100 thus structured, when the electromagnetic coil 63 is energized in a state as shown in FIG. 1, the fixed absorber 59 is excited so that the pilot valve 9 ascends against the spring force of the spring 61 and is adsorbed to the fixed adsorber 59. Thus, the valve port 55 is opened.

Then, the pressure chamber 41 communicates with the low pressure side communicating groove 35 and low pressure side port 15 so that owing to the absorption pressure of the compressor P, the internal pressure of the pressure chamber 41 lowers from the same high pressure as that at the high pressure side port 19 to the same low pressure as that at the low pressure side port 15. Thus, the pressure on the upper side of the main valve element 3 becomes lower than that on the lower side thereof. Because of a resultant pressure difference, the main valve element 3 ascends to leave from the valve seat plate 5. Accordingly, the side of the guiding portion 4, abutting the guiding cylinder 6 of the valve housing 1, slides upwards.

When the valve port 55 abuts the needle valve portion 53 to close it, the ascent of the main valve element 3 is limited. In this case, the pressures on the upper and lower sides of the main valve element 3 are balanced so that the main valve element is placed in a state where it is rotatable with low resistance.

Additionally, when the pilot valve 9 is opened, the internal pressure of the pressure chamber 41 is lowered. This is because the communication degree between the pressure chamber 41 and high pressure side communicating groove 37 is limited to be lower than that of the pressure chamber 41 and low pressure side communicating groove 35 when the pilot valve 9 is opened.

In the above state, by the magnetic interaction between the main magnetic pole 65 and auxiliary magnetic pole 69 and the multi-pole magnet 71, the main valve element 3 is rotated from the first rotary position to the second rotary position and vice versa so that the heat pump cycle is exchanged from the heating mode to the cooling mode and vice versa.

Thereafter, when energization of the electromagnetic coil 63 is stopped, the pilot valve 9 falls by the spring force of the spring 61 to close. Thus, the communication between the pressure chamber 41 and low pressure side communication groove 35 is stopped. Then, the pressure of the high pressure side communicating groove 37 and high pressure side port 19 is introduced into the pressure chamber 41. Thus, the pressure in the pressure chamber 41 becomes equal to that at the bottom of the main valve 3. As a result, owing to the spring force of the spring 61 and weight of the main valve element itself, the main valve element 3 returns to the original descended position so that it is brought into intimate contact with the valve seat plate.

Through the process described above, the valve of exchanging the flow path in the rotary flow-path exchanging valve is completed.

As described above, the material of the stopper pipe 20 is hardened. For this reason, although the stopper pipe 20 is heated to a high temperature by soldering when it is fixed to the high pressure side port 19, the subsequent plastic deformation processing hardens the material of the stopper pipe 20 so that attenuation of the hardness of the stopper pipe 20 is not problematic.

Thus, where the joint pipe 17 and the stopper pipe 20 are wholly integrally formed of an ordinary joint pipe material such as a copper pipe, the stopper pipe 20 is exposed to a high temperature atmosphere owing to a high temperature refrigerant flowing through the high pressure side port 19, the stopper pipe 20 holds a prescribed hardness to maintain required endurance.

Figure 9:
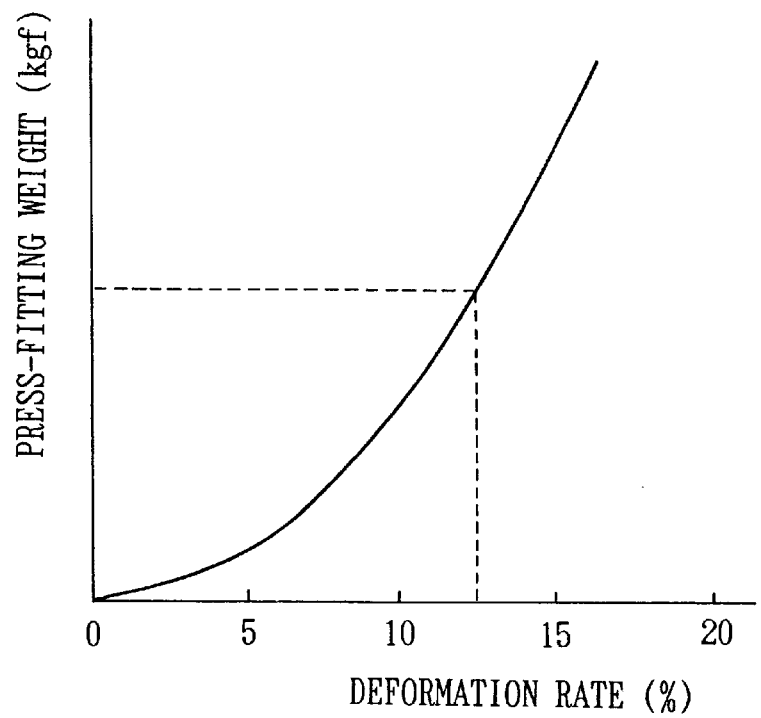
FIG. 9 is a graph showing the relationship between the deformation rate of a stopper pipe and a pressfitting weight.
Figure 10:
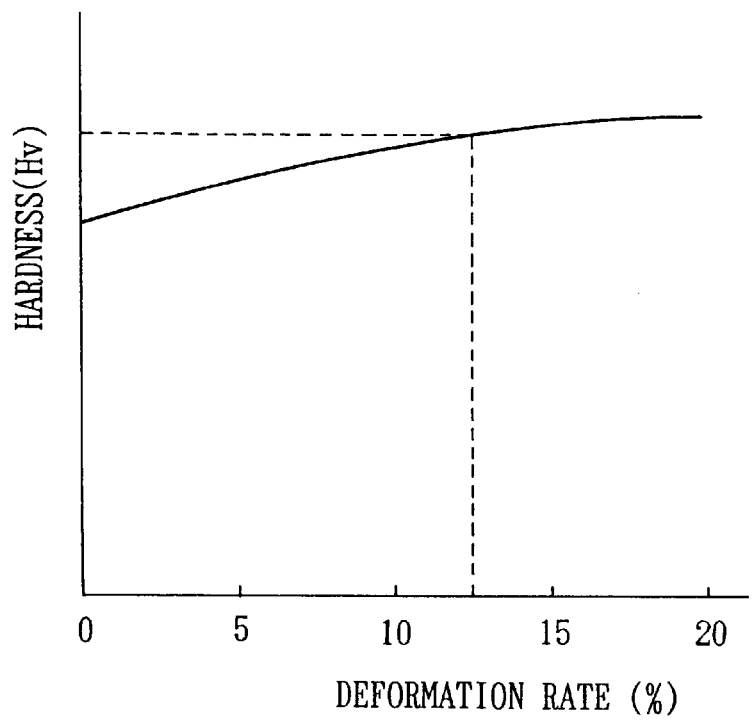
FIG. 10 is a graph showing the relationship between the deformation rate of a stopper and its hardness.

The degree of hardening depends on the deformation coefficient due to plastic deformation processing so that an optimum value of hardening can be obtained by selecting a desired deformation rate. Assuming that the deformation rate E (%) is defined by Equation described below, the relationship between the deformation rate E and press-fitting weight (kgf) is shown in the graph of FIG. 9. The relationship between the deformation rate E and hardness (Hv) is shown in FIG. 10.

$$E=[\{d'-d\}/2]\cdot 100$$

where d' represents an inner diameter after pipe enlarging, d represents before pipe enlarging and t represents pipe thickness.

The hardening of the stopper pipe 20 may be carried out by any plastic deformation such as cold pipe shrinking, grooving as well as pipe enlarging.

The stopper pipe 20 may be provided on the low pressure side port 15 so that it is integral to the joint pipe 13 thereof.

Although the embodiment has been described with reference to the four-way valve, it is needless to say that the present invention can be similarly applied to a three-way rotary valve. The present invention may be applied to not only the rotary flow-path exchanging valve equipped with the pilot valve in which the main valve element is separated from the valve seat during its rotation, but also the ordinary rotary flow-path exchanging valve in which the valve element rotates while it is in contact with the valve seat plate.

What is claimed is:

1. A rotary flow-path exchanging valve comprising:

a cylindrical valve housing;

a valve seat plate having a low pressure side port secured to said valve housing and connected with a low pressure side conduit, a high pressure side port connected to a high pressure side conduit and an exchanging port;

a valve element rotatably provided within said cylindrical valve housing; said valve element being in contact with said valve seat plate in its one end surface so that said exchanging port is selectively communicated with either one of said low pressure side port and said high pressure side port by rotation between a first rotary position and a second rotary position, said valve element having a high pressure communicating groove for communicating said high pressure side port with said exchanging port and a low pressure communicating groove for communicating said low pressure side port with said exchanging port;

an electromagnetic solenoid for rotating said valve element;

a hard stopper pipe secured to either one of said high pressure side port and said low pressure side port and protruding into said high pressure communicating groove or said low pressure side communicating groove, said stopper pipe abutting on different side walls apart from each other of said high pressure side communicating groove or said low pressure side communicating groove in a rotary direction of said valve element to limit a rotation range of the valve element between said first rotary position and said rotary position.

2. A rotary flow-path exchanging valve according to claim 1, further comprising a joint pipe for conduit connection attached to said high pressure side port or said low pressure side port and formed integrally to said stopper pipe.

3. A rotary flow-path exchanging valve according to claim 1, wherein said valve seat plate has a first exchanging port and a second exchanging port;

at said first rotary position of said valve element, said low pressure side port is communicated with said first exchanging port and said high pressure side port is communicated with said second exchanging port, at said second rotary position of said valve element, said low pressure side port is communicated with said second exchanging port and said high pressure side port is communicated with said first exchanging port; and said flow-path exchanging valve is a four-way valve used in a heat pump system.

4. A rotary flow-path exchanging valve according to claim 2, wherein said valve seat plate has a first exchanging port and a second exchanging port;

at said first rotary position of said valve element, said low pressure side port is communicated with said first exchanging port and said high pressure side port is communicated with said second exchanging port, at said second rotary position of said valve element, said low pressure side port is communicated with said second exchanging port and said high pressure side port is communicated with said first exchanging port; and said flow-path exchanging valve is a four-way valve used in a heat pump system.

5. A method for installing a stopper pipe for the rotary flow-path exchanging valve as claimed in claim 1, comprising the steps:

securing said stopper pipe to either one of said high pressure side port and said low pressure side port; and hardening said stopper pipe by plastic deformation.

* * * * *